(12) United States Patent
Hayakawa et al.

(10) Patent No.: US 6,249,858 B1
(45) Date of Patent: Jun. 19, 2001

(54) INFORMATION PROCESSING APPARATUS HAVING A CPU AND AN AUXILIARY ARITHMETIC UNIT FOR ACHIEVING HIGH-SPEED OPERATION

(75) Inventors: Hiroshi Hayakawa, Nagoya; Harutsugu Fukumoto, Anjo; Hiroaki Tanaka; Hideaki Ishihara, both of Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/250,134

(22) Filed: Feb. 16, 1999

(30) Foreign Application Priority Data

Feb. 16, 1998 (JP) .................................................. 10-033199
Nov. 5, 1998 (JP) .................................................. 10-314787

(51) Int. Cl.[7] ........................... G06F 9/302; G06F 13/364
(52) U.S. Cl. ................................. 712/34; 712/221; 712/9
(58) Field of Search ........................... 712/225.34, 220.9, 712/51, 14, 17, 30, 221, 9, 34, 35, 43, 31, 24; 345/157; 711/131, 149; 710/5, 38, 128, 131; 708/233, 507, 232, 510, 508, 685

(56) References Cited

U.S. PATENT DOCUMENTS 3,593,316 * 7/1971 Frieband .............................. 345/157
3,909,800 * 9/1975 Recks et al. ............................ 710/5
4,908,748 * 3/1990 Pathak et al. ......................... 712/220

FOREIGN PATENT DOCUMENTS 0 299 075   1/1989  (EP) .
0 540 175   5/1993  (EP) .
1-255037   10/1989  (JP) .
4-262450    9/1992  (JP) .

OTHER PUBLICATIONS

Electronics, Mar. 1997; pp. 5–7 (with english abstract).
Kiuchi, et al., "RISC Microcomputer SH–DSP for Replacement with DSP". Nikkei Electronics, Jul. 1996, pp. 147–161 (with english abstract).
BEIMS: "The MC68020 32–bit MPU: Opening new doors" WESCON Proceedings vol. 29, No. 1/4, Nov. 19–22, 1985, pp. 1–17, XP000211744 San Francisco, US* p. 7, right–hand column*.
Ertem M C: "A Reconfigurable Co–Processor for Microprocessor Systems" Proceedings of the Southeast Conference, Tampa, Apr. 5–8, 1987, vol. 1, Apr. 5, 1987, pp. 225–228, XP000212298 Institute of Electrical and Electronics Engineers.

* cited by examiner

*Primary Examiner*—Daniel H. Pan
(74) *Attorney, Agent, or Firm*—Pillsbury Winthrop LLP

(57) ABSTRACT

An information processing apparatus such as a microcomputer consisting of a CPU and a coprocessor is provided. The CPU and the coprocessor are connected through a data bus and an address bus. Switches are disposed in the data bus and the address bus which block communication between the CPU and the coprocessor upon execution of an instruction in the coprocessor, thereby allowing the CPU 1 to operate in parallel to the coprocessor.

8 Claims, 11 Drawing Sheets

FIG. 2

| | 4-2-1 |
|---|---|
| A0 | ARITHMETIC DATA FOR FACTORIAL CALCULATION |
| A1 | ARITHMETIC DATA FOR EXPONENTIAL CALCULATION |
| A2 | ARITHMETIC DATA FOR LOGARITHMIC CALCULATION |
| A3 | ARITHMETIC DATA FOR SINE CALCULATION |
| ⋮ | ⋮ |
| A10 | ADDRESS POINTER FOR FACTORIAL CALCULATION |
| A11 | ADDRESS POINTER FOR EXPONENTIAL CALCULATION |
| A12 | ADDRESS POINTER FOR LOGARITHMIC CALCULATION |
| A13 | ADDRESS POINTER FOR SINE CALCULATION |
| ⋮ | ⋮ |
| Am−1 | |
| Am | |

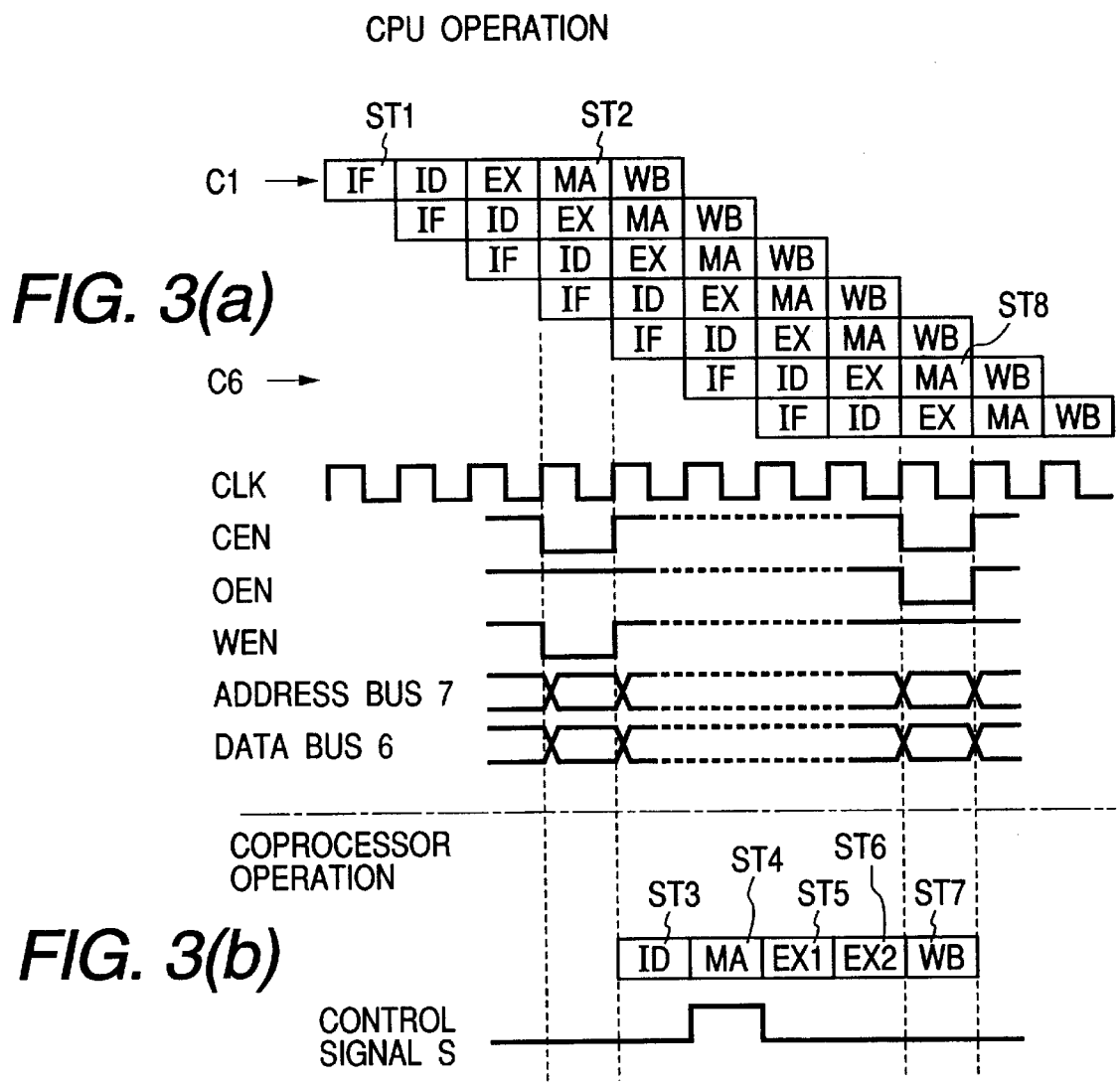

FIG. 6

| | 4-2-1 |
|---|---|
| A0 | ARITHMETIC DATA FOR FACTORIAL CALCULATION |
| A1 | ARITHMETIC DATA FOR EXPONENTIAL CALCULATION |
| A2 | ARITHMETIC DATA FOR LOGARITHMIC CALCULATION |
| A3 | ARITHMETIC DATA FOR SINE CALCULATION |
| ⋮ | ⋮ |
| A10 | ADDRESS POINTER FOR FACTORIAL CALCULATION |
| A11 | ADDRESS POINTER FOR EXPONENTIAL CALCULATION |
| A12 | ADDRESS POINTER FOR LOGARITHMIC CALCULATION |
| A13 | ADDRESS POINTER FOR SINE CALCULATION |
| ⋮ | ⋮ |
| A20 | ADDRESS POINTER OF a[0] |
| A21 | ADDRESS POINTER OF b[0] |
| A22 | N |
| ⋮ | ⋮ |
| Am−1 | |
| Am | |

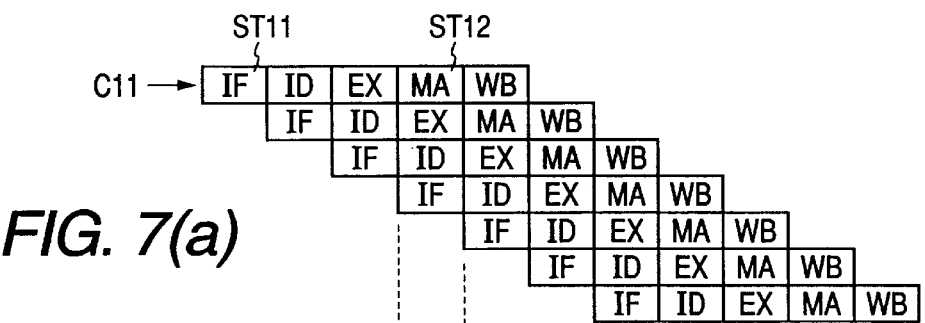
FIG. 7(a)
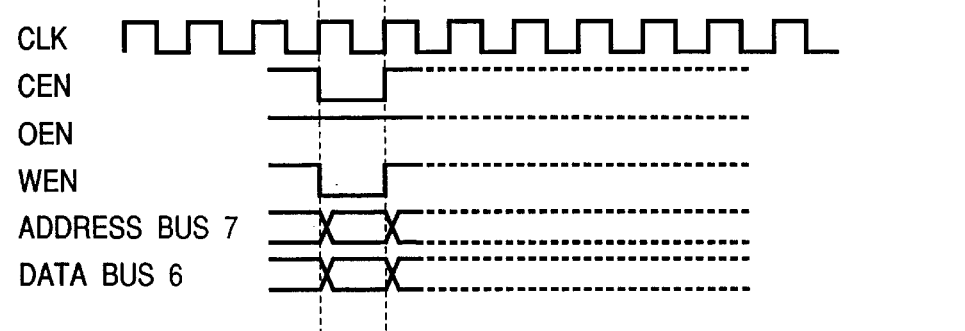
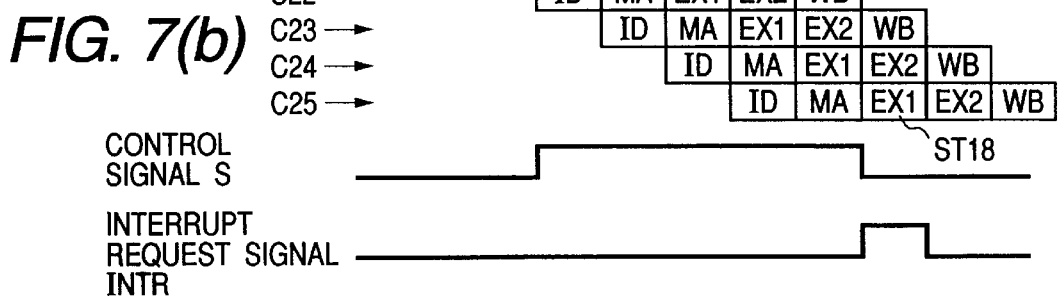
FIG. 7(b)

INFORMATION PROCESSING APPARATUS HAVING A CPU AND AN AUXILIARY ARITHMETIC UNIT FOR ACHIEVING HIGH-SPEED OPERATION

BACKGROUND OF THE INVENTION

1 Technical Field of the Invention

The present invention relates generally to an improvement on an information processing apparatus such as a microcomputer which has a CPU and an auxiliary arithmetic unit such as a coprocessor for achieving high-speed operations.

2 Background Art

Computer systems are known in the art which perform a pipelined operation in which a plurality of instructions are executed in a plurality of parallel steps concurrently and in an overlapped fashion. Specifically, a CPU divides the process of executing each instruction into five stages: IF (instruction fetch), ID (instruction decode), EX (execution), MA (memory access), and WB (write back). The IF stage is a fetch operation which reads an instruction out of a peripheral memory such as a ROM or a RAM. The ID stage is a decode operation in which the instruction is decoded to indicate an operation to be carried out. The EX stage is an execution operation in which the decoded operation is carried out. The MA stage involves a memory access to the peripheral memory for transmission of data between the memory and the CPU. The WB stage is a writing operation to write data in the peripheral memory.

In recent years, microcomputers used in machine control are required to achieve a high-speed operation of the CPU and improvement of ability to process digital signals.

While the high-speed operation of the CPU may be realized to some extent by the pipelined operation as described above, the improvement of ability to process digital signals requires either of the following two methods.

The first is to install a DSP (Digital Signal Processor) in the microcomputer independent of the CPU.

The second is to connect a coprocessor designed to perform special arithmetic operations such as calculation of logarithm or the sum of products which the CPU cannot execute at high speeds with the CPU using a bus for allowing the coprocessor to perform the special arithmetic operations in response to a command issued by the CPU.

The former is not practical because the DSP is bulky, and it is difficult to reduce the size of an LSI.

The latter encounters a difficulty in executing operations concurrently in the CPU and the coprocessor. Specifically, even if the CPU and the coprocessor gain access to different memories during operations, data from the CPU and the coprocessor are transmitted through the same bus, thus resulting in difficulty in proper access to the memories. The latter is, thus, useful in speeding the operation of the CPU, but has a limitation of improvement of ability to process digital signals.

SUMMARY OF THE INVENTION

It is therefore a principal object of the present invention to avoid the disadvantages of the prior art.

It is another object of the present invention to provide an information processing apparatus which has a CPU and a coprocessor and which is capable of executing instructions at high speeds.

According to one aspect of the invention, there is provided an information processing apparatus which comprises: (a) a central processing unit; (b) an auxiliary arithmetic unit connected to the central processing unit through a bus, the auxiliary arithmetic unit being responsive to a start command issued by the central processing unit to execute a given operation; and (c) a switch disposed in the bus to selectively establishing and blocking communication between the central processing unit and the auxiliary arithmetic unit 4. The blocking of the communication allows the central processing unit and the auxiliary arithmetic unit to operate in parallel to each other.

In the preferred mode of the invention, the auxiliary arithmetic unit has memory locations one for each of preselected operations. When data is written by the central processing unit into one of the memory locations, the auxiliary arithmetic unit executes a corresponding one of the preselected operations on the data written into the one of the memory locations and outputs a signal to the switch to block the communication between the central processing unit and the auxiliary arithmetic unit.

A second bus is further provided which is isolated from the bus and which connects with the auxiliary arithmetic unit. A memory is provided which connects with the second bus and which stores therein data on constants used in the operations executed by the auxiliary arithmetic unit.

According to another aspect of the invention, there is provided an information processing apparatus which comprises: (a) a central processing unit; (b) an auxiliary arithmetic unit connected to the central processing unit through a bus; (c) a register installed in the auxiliary arithmetic unit which has memory locations one for each of preselected operations, when data is written by the central processing unit into one of the memory locations, the auxiliary arithmetic unit executing a corresponding one of the preselected operations on the data written into the one of the memory locations; and (d) a dual port memory having two pairs of ports through which data is written into and read out of the dual port memroy, one of each pair of ports being connected to the bus and the other being connected to the auxiliary arithmetic unit through a second bus for allowing the CPU and the auxiliary arithmetic unit to operate in parallel to each other.

In the preferred mode of the invention, a third bus is futher provided which is isolated from the bus and the second bus and which connects with the auxiliary arithmetic unit . A memory is provided which connects with the third bus and which stores therein data on constants used in the operations executed by the auxiliary arithmetic unit.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 2 illustrates memory locations of a register unit of a coprocessor;

FIG. 3(*a*) is a time chart which shows a sequence of operations executed by a CPU;

FIG. 3(*b*) is a time chart which shows a sequence of operations executed by a coprocessor;

FIG. 6 illustrates memory locations of a register unit of a coprocessor in the second embodiment;

FIG. 7(a) is a time chart which shows a sequence of operations executed by a CPU;

FIG. 7(b) is a time chart which shows a sequence of operations executed by a coprocessor;

DESCRIPTION OF THE PREFERRED EMBODIMENTS

Figure 1:
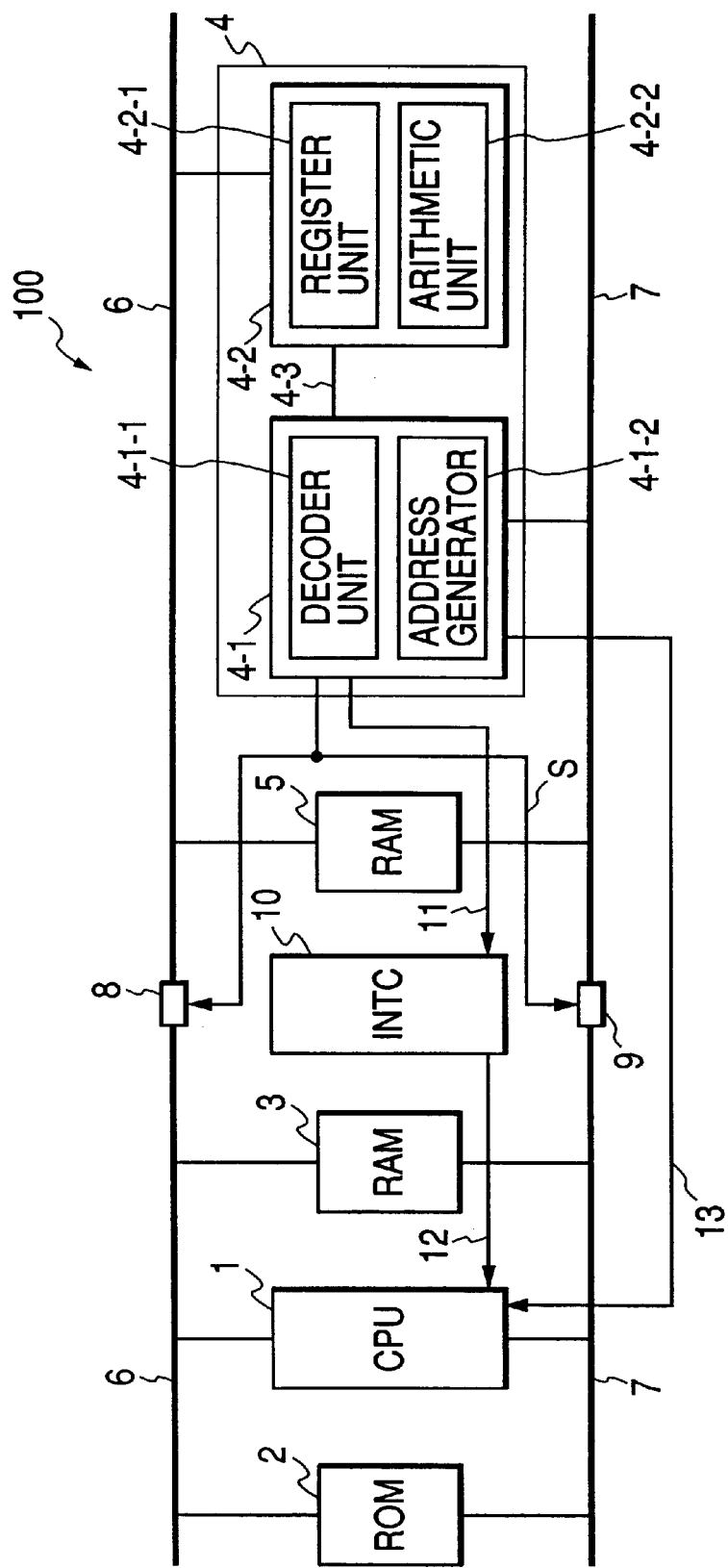
FIG. 1 is a block diagram which shows an information processing apparatus according to the first embodiment of the invention.

Referring now to the drawings, wherein like numbers refer to like parts in several views, particularly to FIG. 1, there is shown an information processing apparatus 100 such as a microcomputer.

The information processing apparatus 100 includes generally a CPU 1 which performs arithmetical and logical operations such as addition, subtraction, etc. and shift operations, a ROM 2 which stores programs to be carried out by the CPU 1, a RAM 3 which stores results of operations carried out by the CPU 1 temporarily, an auxiliary arithmetic unit or coprocessor 4 which performs special arithmetic operations (e.g., factorial, exponential, logarithmic, sine, cosine, and tangent calculations), and a RAM 5 which temporarily stores data on operations to be carried out by the coprocessor 4.

The CPU 1, the coprocessor 4, the ROM 2, and the RAMs 3 and 5 are connected to each other through a data bus 6 and an address bus 7.

Disposed in portions of the data bus 6 and the address bus 7 between the RAM 3 and RAM 5 are separation switches 8 and 9 which are responsive to a control signal S, as will be described later in detail, outputted from the coprocessor 4 to selectively make and break connections in the data bus 6 and the address bus 7. The ROM 2, the CPU 1, and the RAM 3 are connected at all times through the data bus 6 and the address bus 7.

The information processing apparatus 100 also includes an interruption controller (INTC) 10 which controls an interrupt action of the CPU 1. The interruption controller 10 connects with the coprocessor 4 and the CPU 11 through control lines 11 and 12, respectively. The interruption controller 10 is responsive to an interruption standby signal from the coprocessor 4 through the control line 11 to prohibit the CPU 1 from executing a given interruption routine and enables execution of the interruption routine when an interrupt request signal is inputted from the coprocessor 4.

The coprocessor 4 consists essentially of a control section 4-1 and an arithmetic section 4-2. The control section 4-1 is designed to control execution of an operation in the arithmetic section 4-2 which is specified by the CPU 1 and connects with the arithmetic section 4-2 through a control line 4-3. The arithmetic section 4-2 connects with the data bus 6. The control section 4-1 connects with the address bus 7.

The arithmetic section 4-2 includes a register unit 4-2-1 to which the CPU 1 gains access and an arithmetic unit 4-2-2. The control section 4-1 includes a decoder unit 4-1-1 and an address generating unit 4-1-2 which outputs an address to the address bus 7 for access to the peripheral memories (i.e., the ROM 2 and RAMs 3 and 5).

The register unit 4-2-1 of the arithmetic section 4-2, as shown in FIG. 2, has memory locations, as indicated by addresses A0, A1, A2, . . . , in which different types of arithmetic operations are defined, respectively.

When data from the CPU 1 is written in any one of memory locations of the register unit 4-2-1, as indicated by an address Ax (x=a positive integer), the coprocessor 4 executes an operation specified by the address Ax using the written data and provides the control signal S to open the separation switches 8 and 9 to block the connections in the data bus 6 and the address bus 7 for a period of time the operation is executed.

When the separation switches 8 and 9 are opened, the CPU 1 has a difficulty in commanding the coprocessor 4 to start another operation. The coprocessor 4, therefore, outputs a high-level signal to the CPU 1 through the control line 13 during execution of the operation to inhibit the CPU 1 from issuing the operation-starting command to the coprocessor 4. The CPU 1 may have a circuit which is designed to set a flag when issuing the operation-starting command to the coprocessor 4 and reset the flag upon completion of the operation of the coprocessor 4 and outputs no operation-starting command during setting of the flag. Alternatively, the coprocessor 4 may be designed to output an answer signal (i.e., an acknowledgement signal) to a request signal from the CPU 1 only when the operation is not executed. The CPU 1 may not issue the operation-starting command unless the CPU 1 receives the answer signal from the coprocessor 4.

This embodiment employs direct addressing and indirect addressing modes in inputting data to the arithmetic section 4-2 of the coprocessor 4. In the direct addressing mode, data written by the CPU 1 in the register unit 4-2-1 is used as arithmetic data or operand as it is. In the indirect addressing mode, data written by the CPU 1 in the register unit 4-2-1 is used as an address pointer specifying a location in the RAM 5 where a corresponding arithmetic data is stored.

Specifically, the register unit 4-2-1, as shown in FIG. 2, has two memory locations for each operation, one being used in the direct addressing mode and the other in the indirect addressing mode. For instance, the memory locations A0 and A10 are provided for the factorial calculation in the direct addressing and indirect addressing modes, respectively.

The operation of the coprocessor 4 will be described below.

First, an example where the coprocessor 4 executes the exponential calculation in the indirect addressing mode will be discussed.

K1 When the CPU 1 receives a memory transfer instruction and writes data in the memory location A11 of the register unit 4-2-1, as shown in FIG. 2, the decoder unit 4-1-1 of the control section 4-1 determines that an instruction given by the CPU 11 is to perform the exponential calculation in the indirect addressing mode.

K2 The decoder unit 4-1-1 outputs the control signal S to open the separation switches 8 and 9, thereby blocking communication between the CPU 1 and the coprocessor 4 through the buses 6 and 7.

K3 Next, the decoder unit 4-1-1 reads data out of the memory location A11 of the register unit 4-2-1 through the control line 4-3 and output it to the address bus 7 through the address generating unit 4-1-2. Simultaneously, the decoder unit 4-1-1 outputs a read signal to the RAM 5 to transfer arithmetic data stored in the RAM 5, as specified by the address pointer in the memory location A11 of the register unit 4-2-1, to the arithmetic unit 4-2-2 of the arithmetic section 4-2 through the data bus 6. The separation switches 8 and 9 are, as described above, opened to block the communication between the CPU 1 and the coprocessor 4 through the buses 6 and 7, thus allowing the coprocessor 4 to gain access to the RAM 5 independent of the CPU 1. Similarly, the CPU 1 may gain access to the ROM 2 and the RAM 3 independent of the coprocessor 4.

K4 The decoder unit 4-1-1 outputs an exponential calculation control signal to the arithmetic unit 4-2-2 through the control line 4-3. The arithmetic unit 4-2-2 executes the exponential calculation on the arithmetic data read out of the RAM 5 and stores the result thereof in an operation result memory location of the register unit 4-2-1 which is provided, for example, in the last of the memory locations, as indicated by Am in FIG. 2.

K5 Upon completion of the operation in the arithmetic unit 4-2-2, the decoder unit 4-1-1 outputs the control signal S to close the separation switches 8 and 9. The operation of the coprocessor 4 terminates.

When the separation switches 8 and 9 are closed, it allows the CPU 1 to read the data out of the operation result memory location Am of the register unit 4-2-1 to analyze the result of the exponential calculation.

The above steps K1 to K5 will be described in more detail. with reference to time charts shown in FIGS. 3(a) and 3(b). In the following discussion, it is assumed that the CPU 1 is designed to execute a typical five-stage pipelined operation in which one instruction is, as shown in FIG. 3(a), carried out in IF (instruction fetch), ID (instruction decode), EX (execution), MA (memory access), and WB (write back) stages, and a plurality of instructions are carried out in a parallel fashion with a time-offset of one stage cycle in synchronism with clocks CLK.

In brief, the CPU 1 fetches an instruction from the ROM 2 in the IF stage, decodes the instruction through an internal decoder (not shown) in the ID stage, and executes the decoded instruction in the EX stage. Additionally, the CPU 1 uses the result of execution of the instruction in the EX stage as an address to gain access to peripheral memories (i.e., the ROM 2, the RAMs 3 and 5, and the register unit 4-2-1) in the MA stage and write the result of execution of the instruction in the EX stage and/or data read out of the peripheral memories in the WB stage into an internal register (not shown) in the WB stage.

Referring to FIG. 3(a), assuming that the CPU 1 fetches, in the IF stage ST1 of the first instruction processing cycle C1, a start instruction to have the coprocessor 4 execute the exponential calculation in the indirect addressing mode (i.e., an instruction to write data into the memory location A11 of the register unit 4-2-1) from the ROM 2, the CPU 1 outputs, in the MA stage ST2, a chip enable signal CEN and a write enable signal WEN of lower levels that are active levels to the coprocessor 4. The CPU 11 also outputs an address A11 to the address bus 7 and data to be written into a location of the register unit 4-2-1 as specified by the address A11 to the data bus 6.

In the ID stage ST3, as shown in FIG. 3(b), the decoder unit 41-1 of the coprocessor 4 analyzes the chip enable signal CEN, the write enable signal WEN, and the address A11 to determine that the instruction given by the CPU 1 is to perform the exponential calculation in the indirect addressing mode. The decoder unit 4-1-1 also reads the data out of the location of the register unit 4-2-1 as specified by the address A11 which was written by the CPU 1 and activates the address generating unit 4-1-2 to generate an address to be outputted to the address bus 7.

In the MA stage ST4, the decoder unit 4-1-1 switches the control signal S to the high level to open the separation switches 8 and 9 and outputs the address generated by the address generating unit 4-1-2 to the address bus 7. The decoder unit 4-1-1 also outputs a chip enable signal and an output enable signal of the low level to the RAM 5 to supply arithmetic data from a location of the RAM 5 as specified by the address sent through the address bus 7 to the coprocessor 4 through the data bus 6.

In the following EX1 stage ST5, the decoder unit 4-1-1 switches the control signal S to the low level to close the separation switches 8 and 9. In both the EX1 stage ST5 and the subsequent EX2 stage ST6, the arithmetic unit 4-2-2 executes the exponential calculation. Note that the number of EX stages executed sequentially by the coprocessor 4 depends upon the type of an instruction. In the shown example, two consecutive EX stages (i.e., EX1 and EX2) are provided following the MA stage. The control signal S may alternatively be changed to the low level in the WB stage following the EX2 stage.

In the WB stage, the result of execution of the exponential calculation carried out by the arithmetic unit 4-2-2 is stored in the operation result memory location Am of the register unit 4-2-1.

The CPU 1 is responsive to an instruction to fetch data from the register unit 4-2-1 of the coprocessor 4 to provide the chip enable signal CEN and the output enable signal OEN of the low level that is an active level to the coprocessor 4 in, for example, the MA stage ST8 of the sixth instruction processing cycle C6. The CPU 1 also outputs an address Am specifying the operation result memory location Am of the register unit 4-2-1 to the address bus 7 to read the result of execution of the exponential calculation out of the register unit 4-2-1 through the data bus 6 and write it into the internal register thereof.

In a case where the CPU 1 writes data into the memory location A10 of the register unit 4-2-1, the factorial calculation is performed in the same steps as the above described K1 to K5 using arithmetic data stored in a location of the RAM 5 as specified by an address pointer, i.e., data held in the memory location A10 of the register unit 4-2-1. Similarly, in a case where the CPU 1 writes data into the memory location A12 of the register unit 4-2-1, the logarithmic calculation is performed on arithmetic data stored in a location of the RAM 5 as specified by an address pointer, i.e., data held in the memory location A12 of the register unit 4-2-1.

An example where the coprocessor 4 performs the exponential calculation in the direct addressing mode will be discussed below.

D1 When the CPU 1 receives a memory transfer instruction and writes data in the memory location A1 of the register unit 4-2-1, as shown in FIG. 2, the decoder unit 4-1-1 of the control section 4-1 determines that an instruction given by the CPU 11 is the exponential calculation in the direct addressing mode.

D2 The decoder unit 4-1-1 outputs the control signal S to open the separation switches 8 and 9, thereby blocking communication between the CPU 1 and the coprocessor 4 through the buses 6 and 7.

D3 Next, the decoder unit 4-1-1 outputs an exponential calculation control signal to the arithmetic unit 4-2-2 through the control line 4-3. The arithmetic unit 4-2-2 executes the exponential calculation on arithmetic data written in the memory location A1 of the register unit 4-2-1 and stores the result thereof in the operation result memory location Am of the register unit 4-2-1.

K4 Upon completion of the operation in the arithmetic unit 4-2-2, the decoder unit 4-1-1 outputs the control signal S to close the separation switches 8 and 9.

In a case where the CPU 1 writes data into the memory location A0 of the register unit 4-2-1, the factorial calculation is performed in the same steps as the above D1 to D5, using arithmetic data stored in a location of the RAM 5 as specified by an address pointer, i.e., data held in the memory location A0 of the register unit 4-2-1. Similarly, in a case where the CPU 1 writes data into the memory location A2 of the register unit 4-2-1, the logarithmic calculation is performed on arithmetic data stored in a location of the RAM S as specified by an address pointer, i.e., data held in the memory location A2 of the register unit 4-2-1.

Figure 4A:
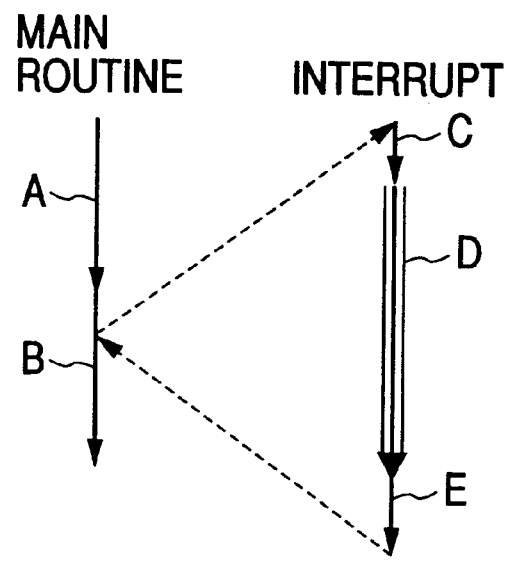
FIG. 4(a) illustrates an overall operation of a conventional microcomputer.

An example of an overall operation of the information processing apparatus 100 will be discussed below with reference to FIGS. 4(a) and 4(b).

In the drawings, A and B indicate programs in a main routine (i.e., main programs) executed in sequence cyclically by the CPU 1. C indicates a program in an interrupt routine executed by the CPU 1. D indicates a program in the interrupt routine executed by the coprocessor 4 using the result of execution of the program C. Specifically, the program D is a program to perform a special arithmetic operation such as factorial, exponential, logarithmic, sine, cosine, or tangent calculation. E indicates is a program in the interrupt routine executed by the CPU 1 using the result of execution of the program D. The last two instructions of the program C are a start instruction to start the program D (i.e., an instruction to write data into any one of the locations of the register unit 4-2-1 of the coprocessor 4 to operate the coprocessor 4) and a return instruction to return the operation of the microcomputer 100 to the main programs A and B from the program C.

Figure 4B:
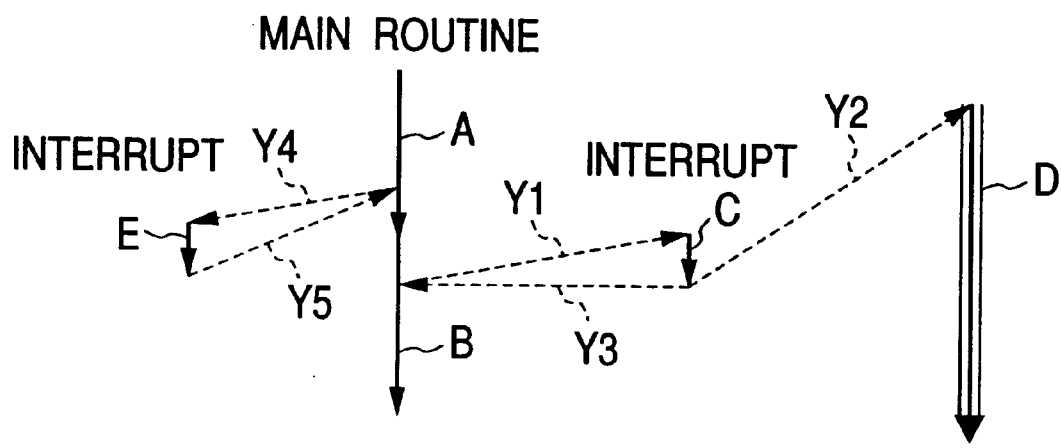
FIG. 4(b) illustrates an overall operation of the information processing apparatus shown in FIG. 1.

When an interrupt occurs asynchronously during execution of the main program B for example, the CPU 1 saves the contents of the register, a program counter, and a status register disposed therein and initiates the program C, as indicated by an arrow Y1 in FIG. 4(b).

When the CPU 1 executes the last two instructions (i.e., the start instruction and the return instruction), the coprocessor 4 starts, as indicated by an arrow Y2 in FIG. 4(b), to handle the program D (i.e., the special arithmetic operation). The CPU 1 resumes, as indicated by an arrow Y3 in FIG. 4(b), executing the main program B.

During execution of the program D, that is, operation of the coprocessor 4, the separation switches 8 and 9 are, as described above, opened by the decoder unit 4-1-1 of the control section 4-1 to block the communication between the CPU 1 and the coprocessor 4. This allows the CPU 1 to gain access to the ROM 2 and the RAM 3 independent of access of the coprocessor 4 to the RAM 5 so that the CPU 1 may execute the main programs A and B in parallel to the program D executed by the coprocessor 4, thus resulting in a decrease in time required for the overall operation of the information processing apparatus 100.

Upon completion of the program D, the control section 4-1 closes the separation switches 8 and 9 to connect the coprocessor 4 with the CPU 1. Simultaneously, the control section 4-1 outputs an interrupt request signal to the interruption controller 10 to have the CPU 1 initiate the program E, as indicated by an arrow Y4 in FIG. 4(b), during execution of the program A for example.

Subsequently, when the last instruction of the program E (i.e., the return instruction) is executed, the CPU 1 resumes executing the main program A.

In this embodiment, the control section 4-1 of the coprocessor 4 opens the separation switches 8 and 9 both in the direct addressing mode and in the indirect addressing mode, but may alternatively open the separation switches 8 and 9 only in the indirect addressing mode wherein it is required to gain access to the RAM 5.

Figure 5:
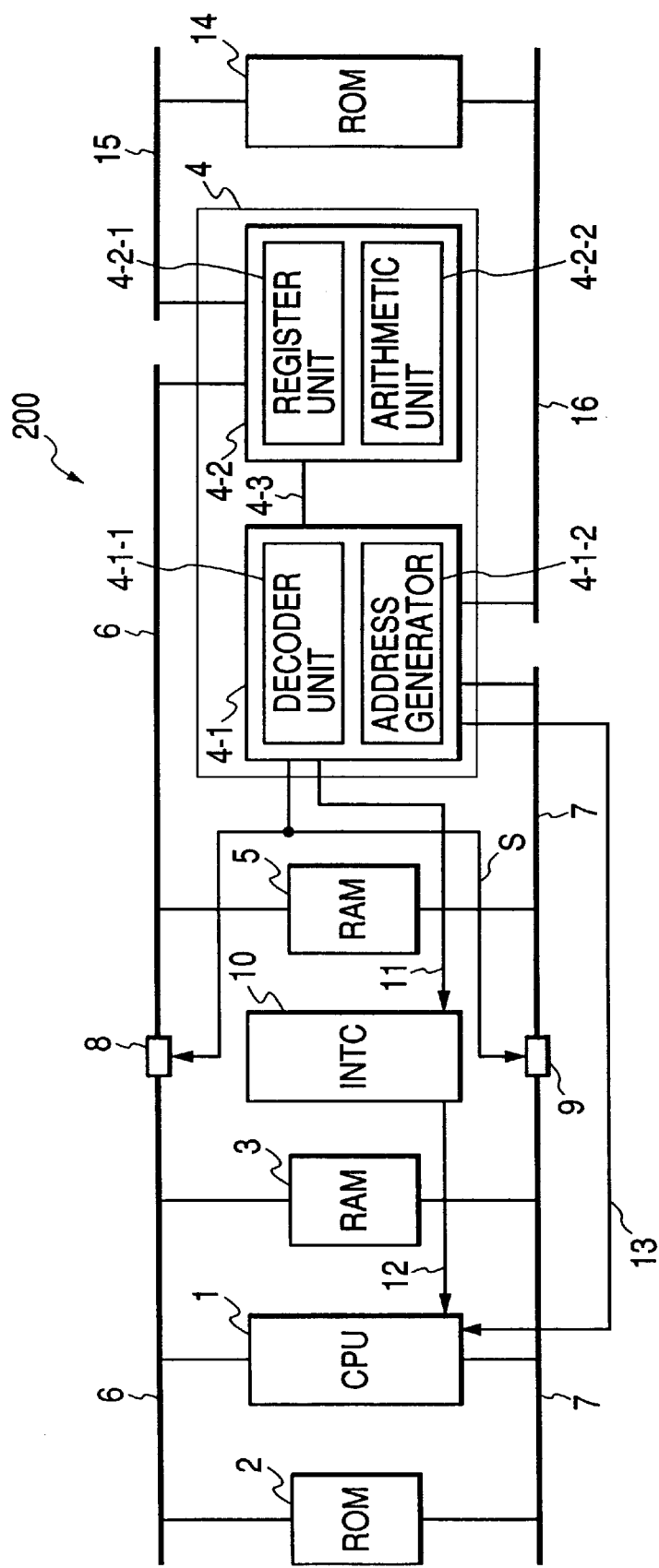
FIG. 5 is a block diagram which shows an information processing apparatus according to the second embodiment of the invention.

FIG. 5 shows an information processing apparatus or microcomputer 200 according to the second embodiment of the invention which is different from the first embodiment in that a ROM 14 storing therein constants used in executing the special arithmetic operations in the coprocessor 4 is disposed in connection with the arithmetic section 4-2 and the control section 4-1 through the second data bus 15 and the second address bus 16. Other arrangements are identical, and explanation thereof in detail will be omitted here.

The ROM 14 stores therein as the constants a plurality of filtering coefficients b[n] used in calculating the sum of products ($\Sigma(a[n] \times b[n])$: n=0, 1, 2, ..., N−1) through digital filtering in the coprocessor 4. The register unit 4-2-1 of the arithmetic section 4-2 of the coprocessor 4 has, as shown in FIG. 6, three memory locations A20, A21, and A22 for use in calculating the sum of product in the digital filtering.

In the memory location A20, an address pointer is written by the CPU 1 which indicates a location of the RAM 5 where first arithmetic data a[0] used in calculating the sum of products is held. In the memory location A21, an address pointer is written by the CPU 1 which specifies a location of the RAM 14 where a first filtering coefficient b[0] is held. In the memory location A22, data N on the number of products to be summed up (i.e., the filtering order) is written by the CPU 1.

The calculation of the sum of product is performed by the coprocessor 4 in the following manner. Assume that the CPU 1 prestores in the RAM 5 arithmetic data (a[n]: n=0, 1, 2, ..., N−1) used in calculating the sum of products. Other arithmetic operations are executed in the same manner as discussed in the first embodiment.

W1 When the CPU 1 receives a memory transfer instruction and writes data, in sequence, into the memory locations A20, A21, and A22 of the register unit 4-2-1, the decoder unit 4-1-1 of the control section 4-1 determines based on writing of the data N in the memory location A22 that an instruction given by the CPU 11 is to perform the sum of product calculation.

W2 The decoder unit 4-1-1 outputs the control signal S to open the separation switches 8 and 9, thereby blocking communication between the CPU 1 and the coprocessor 4 through the buses 6 and 7.

W3 Next, the decoder unit 4-1-1 fetches the data N from the memory location A22 of the register unit 4-2-1 through the control line 4-3 and stores it in an internal register as a parameter indicating the number of products to be summed up.

W4 The decoder unit 4-1-1 fetches data or address pointers from the memory locations A20 and A21 which specify the location of the RAM 5 where the first arithmetic data a[0] is held and the location of the RAM 14 where the first filtering coefficient b[0] is held and outputs them to the address bus 7 and the second address bus 16, respectively.

Simultaneously, the decoder unit 4-1-1 outputs read signals to the RAM 5 and the ROM 14 to transfer the first arithmetic data a[0] specified by the address pointer stored in the memory location A20 and the first filtering coefficient b[0] specified by the address pointer stored in the memory location A21 to the arithmetic unit 4-2-2 of the arithmetic section 4-2 through the data bus 6 and the second data bus 15.

W5 The decoder unit 4-1-1 outputs a sum-of-product calculation control signal to the arithmetic unit 4-2-2 through the control line 4-3. The arithmetic unit 4-2-2 performs the first calculation of the sum of products using the arithmetic data a[0] and the filtering coefficient b[0] read out of the RAM 5 and the ROM 14 and stores the result thereof in the operation result memory location Am of the register unit 4-2-1.

Subsequently, the decoder unit 4-1-1 repeats steps W6 and W7, as discussed below, N times based on a count value of an internal counter to sum up N products.

W6 The decoder unit 4-1-1 outputs data, derived by adding or subtracting a given offset (e.g., 1) to or from data previously outputted to the address bus 7, to the address bus 7 through the address generating unit 4-1-2. Additionally, the decoder unit 4-1-1 outputs data, derived by adding or subtracting a given offset (e.g., 1) to or from data previously outputted to the address bus 16, to the address bus 16 through the address generating unit 4-1-2.

Simultaneously, the decoder unit 4-1-1 outputs the read signals to the RAMS and the ROM 14 to transfer the nth arithmetic data a[n] (n≧2) stored in the RAM 5 and the nth filtering coefficient b[n] stored in the ROM 14 to the arithmetic unit 4-2-2 of the arithmetic section 4-2 through the data bus 6 and the second data bus 15.

W7 Further, the decoder unit 4-1-1 outputs the sum-of-product calculation control signal to the arithmetic unit 4-2-2 through the control line 4-3. The arithmetic unit 4-2-2 performs the nth calculation of the sum of products using the arithmetic data a[n] and the filtering coefficient b[n] read out of the RAM 5 and the ROM 14 and stores the result thereof in the operation result memory location Am of the register unit 4-2-1 to update the data therein.

W8 After the above steps W6 and W7 are executed N times, the decoder unit 4-1-1 outputs the control signal S to close the separation switches 8 and 9 to complete the operation of the coprocessor 4. The CPU 1 reads the data out of the operation results memory location Am of the register unit 4-2-1 to find the result of calculation of the sum of products ($\Sigma(a[n] \times b[n])$).

The above steps W1 to W8 will be described in more detail. with reference to time charts shown in FIGS. 7(a) and 7(b).

It is assumed that the CPU 1 is designed to execute a typical five-stage pipelined operation, that the CPU 1 fetches, in the IF stage ST11 of the first instruction processing cycle C1, a start instruction to have the coprocessor 4 execute the calculation of the sum of products (i.e., an instruction to write data into the memory location A22 of the register unit 4-2-1) from the ROM 2, and that the coprocessor 4 executes the calculation of the sum of products N times in sequence (i.e., the data N written into the memory location A22 of the register unit 4-2-1 represents four (4)).

In the MA stage ST12 of the first instruction processing cycle C1, the CPU 1 outputs to the coprocessor 4 a chip enable signal CEN and a write enable signal WEN of lower levels that are active levels. The CPU 11 also outputs an address A22 to the address bus 7 and data to be written into a location of the register unit 4-2-1 as specified by the address A22 to the data bus 6.

In the ID stage ST13 of the first instruction processing cycle C21, as shown in FIG. 7(b), the decoder unit 4-1-1 of the coprocessor 4 analyzes the chip enable signal CEN, the write enable signal WEN, and the address A22 to determine that the instruction given by the CPU 1 is to perform the calculation of the sum of products. The decoder unit 4-1-1 also reads the data out of the locations of the register unit 4-2-1 as specified by the addresses A20, A21, and A22 which were written by the CPU 1 and activates the address generating unit 4-1-2 to generate addresses to be outputted to the address buses 7 and 16. The data read out of the memory location A20 of the register unit 4-2-1 represents the address to be outputted to the address bus 7. The data read out of the memory location A21 represents the address to be outputted to the second address bus 16.

In the MA stage ST14, the decoder unit 4-1-1 switches the control signal S to the high level to open the separation switches 8 and 9 and outputs the addresses generated by the address generating unit 4-1-2 to the address bus 7 and the second address bus 16. The decoder unit 4-1-1 also outputs a chip enable signal and an output enable signal of the low level to the RAM 5 and the ROM 16 to transfer arithmetic data and a filtering coefficient from locations of the RAM 5 and the ROM 16 as specified by the addresses sent through the address bus 7 and the second address bus 16 to the coprocessor 4 through the data bus 6 and the second data bus 15, respectively.

In the EX1 stage ST15 and the following EX2 stage ST16, the arithmetic unit 4-2-2 performs the calculation of the sum of products one time on the arithmetic data and the filtering coefficient read out of the RAM 5 and the ROM 14 in the MA stage ST 14. Note that the number of EX stages executed sequentially by the coprocessor 4 depends upon the type of an instruction. In the shown example, two consecutive EX stages (i.e., EX1 and EX2) are provided following the MA stage.

In the WB stage, the coprocessor 4 stores the result of the calculation in the operation result memory location Am of the register unit 4-2-1. If the sum of products is calculated sequentially, the result may be stored temporarily in an accumulator and not the register unit 4-2-1.

The operations of the coprocessor 4 as discussed so far are executed in the first instruction processing cycle C21 to make the first calculation of the sum of products. Following calculations of the sum of products are, as clearly shown in FIG. 7(b), performed in parallel in the pipelined operation.

For example, in a case where the sum of products is calculated in sequence five times, the five calculations are carried out in the five instruction processing cycles C21 to C25 with time-Offsets of one stage. In the ID stage of each of the instruction processing cycles C22 to C25 following the first one C21, the decoder unit 4-1-1 adds or subtracts a given offset (e.g., 1) to or from data previously outputted to each of the address buses 7 and 16 and outputs it to each of the address buses 7 and 16 through the address generating unit 4-1-2.

The control signal S outputted to each of the separation switches 8 and 9 is, as shown in FIG. 7(b), kept at the high level for a period of time the MA stages of the instruction processing cycles C21 to C25 are executed in sequence, thereby allowing the CPU 1 to operate in parallel to the coprocessor 4. Upon completion of the MA stage ST18 of the fifth instruction processing cycle C25, the control signal S is changed to the low level to close the separation switches 8 and 9. Simultaneously, the coprocessor 4 outputs the interrupt request signal INTR of the high level to the control line 11 to allow the CPU 1 to read data (i.e., the result of calculation of the sum of products) out of the operation result memory location Am of the register unit 4-2-1 in the interrupt routine.

Usually, entrance of a CPU into an interrupt routine requires execution of an operation of an interrupt sequencer to save the contents of a register, a program counter, and a status register. It is, thus, advisable that the timing with which the interrupt request signal INTR is outputted, that is, changed to the high level be determined depending upon the number of cycles in which the operation of the interrupt sequencer is executed for allowing the CPU 1 to execute an instruction in the interrupt routine to read the result of calculation of the sum of products out of the coprocessor 4 immediately after completion of the operation of the coprocessor 4. In the shown example, the interrupt request signal INTR is changed to the high level in the EX1 stage ST18 of the final instruction processing cycle C25.

When the CPU 1 reads the result of calculation out of the coprocessor 4, it outputs the chip enable signal CEN and the output enable signal OEN of the low level that is an active level to the coprocessor 4, similar to the MA stage ST8 of the sixth instruction processing cycle C6 in FIG. 3(a) and also outputs an address Am specifying the operation result memory location Am of the register unit 4-2-1 to the address bus 7.

Figure 8A:
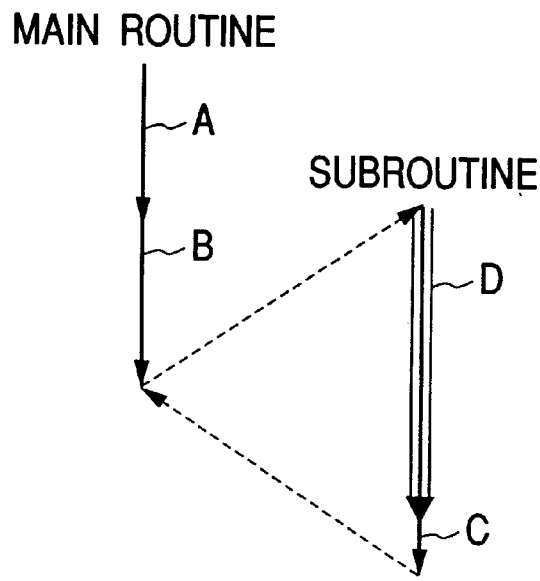
FIG. 8(a) illustrates an overall operation of a conventional microcomputer.

An example of an overall operation of the microcomputer 200 will be discussed below with reference to FIGS. 8(a) and 8(b).

A and B indicate main programs executed in sequence cyclically by the CPU 1. D indicates a program in a subroutine which is executed by the coprocessor 4 to make a calculation of the sum of products in the digital filtering using the result of an operation of the main program B. C indicates a program in an interrupt routine executed by the CPU 1 using the result of an operation of the program D.

The last two instructions of the program B are a start instruction to start the program D (i.e., an instruction to write data into the memory locations A20, A21, and A22 of the register unit 4-2-1 of the coprocessor 4 to have the coprocessor 4 execute the calculation of the sum of products) and a return instruction to return the operation of the microcomputer 200 to the first step of the main program A from the program B.

Figure 8B:
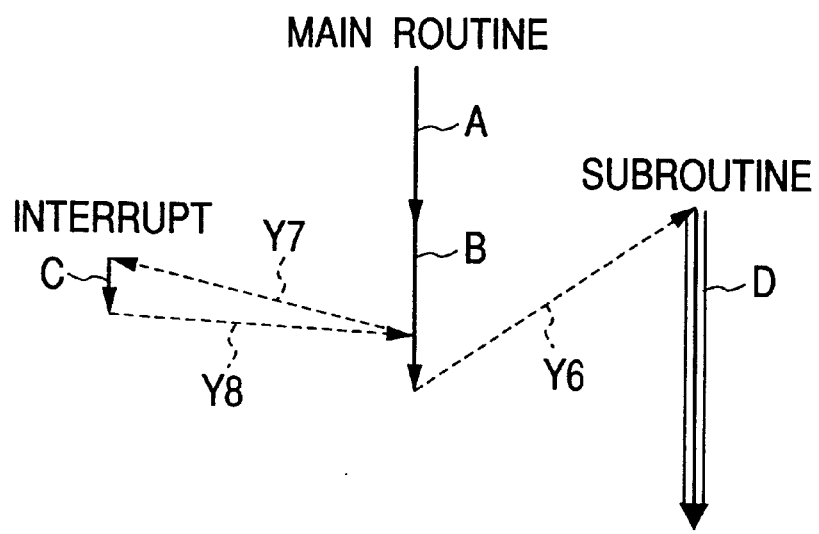
FIG. 8(b) illustrates an overall operation of the information processing apparatus shown in FIG. 5.

Upon execution of the last two instructions of the program B in the CPU 1, the coprocessor 4, as indicated by an arrow Y6 in FIG. 8(b), performs the program D to calculate the sum of product. The CPU 1 executes a sequence of the main programs A and B again.

During the execution of the program D, that is, operation of the coprocessor 4, the separation switches 8 and 9 are, as described above, opened to separate the CPU 1 from the coprocessor 4, thereby allowing the CPU 1 to execute the main programs A and B in parallel to the program D executed by the coprocessor 4, thus resulting in a decrease in time required for the overall operation of the microcomputer 200.

Upon completion of the program D, the control section 4-1 closes the separation switches 8 and 9 to connect the coprocessor 4 with the CPU 1. Simultaneously, the control section 4-1 outputs the interrupt request signal to the interruption controller 10 to have the CPU 1 initiate the program C, as indicated by an arrow Y7 in FIG. 8(b).

Subsequently, when the last instruction of the program C (i.e., the return instruction) is executed, the CPU 1 resumes executing a sequence of the main programs A and B, as indicated by a n arrow Y8 in FIG. 8(b).

The separation switches 8 and 9 are, as described above, opened to isolate the CPU 1 from the coprocessor 4 during the execution of the program D. If the separation switches 8 and 9 are not installed in the data bus 6 and the address bus 7, the program C, as shown in FIG. 8(a), needs to be performed immediately following the program D in the subroutine, so that the sequence of the main programs A and B cannot be performed in parallel to the program D.

The coprocessor 4, as described above, connects with the ROM 14 through the second data bus 15 and the second address bus 16 independent of the data bus 6 and the address bus 7. This allows the coprocessor 4 to read the arithmetic data and the filtering coefficient out of the RAM 5 and the ROM 14 simultaneously to calculate the sum of products effectively within a decreased operation time.

The comparison of the microcomputers 100 and 200 of the invention with a conventional microcomputer in terms of the advantage offered by use of the separation switches 8 and 9 will be discussed below with reference to FIGS. 9(a) and 9(b). In the following discussion, it is assumed that the conventional microcomputer has substantially the same circuit structure as that of one of the microcomputers 100 and 200 except the separation switches 8 and 9.

Figure 9A:
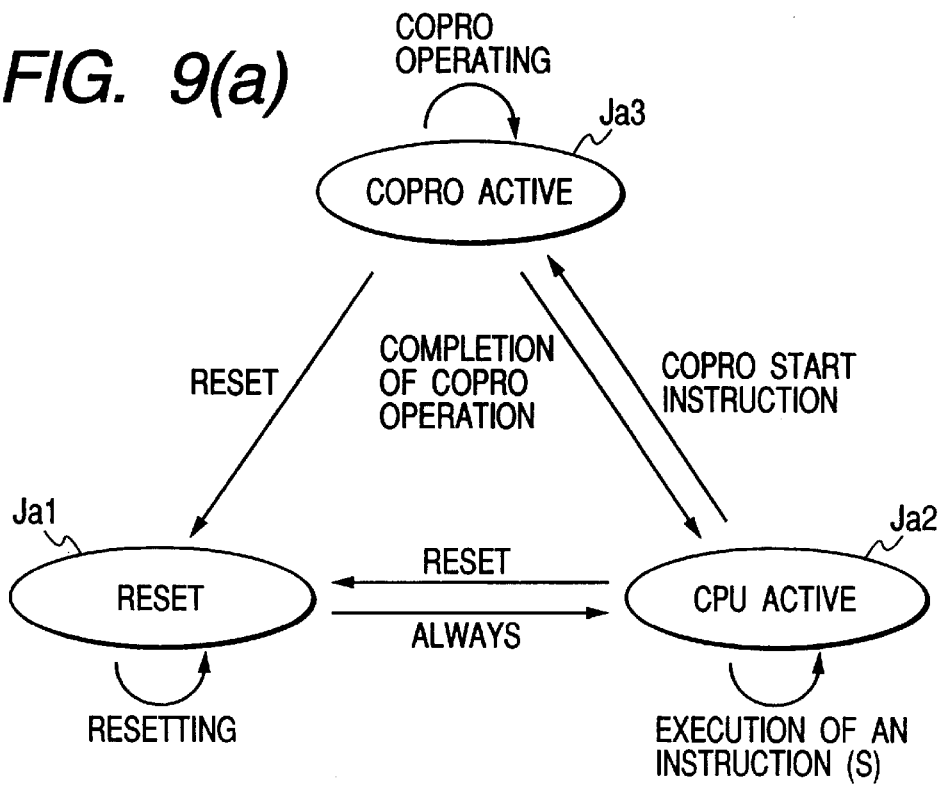
FIG. 9(a) is a state transition diagram of a conventional microcomputer not having separation switches.

FIG. 9(a) is a state transition diagram of the conventional microcomputer. FIG. 9(b) is a state transition diagram of the microcomputers 100 and 200. In the following discussion, "CoPro" indicates the coprocessor 4.

The conventional microcomputer, as clearly shown in FIG. 9(a), has three states: a reset state Ja1, a CPU active state Ja2, and a CoPro active state Ja3.

In the reset state Ja1, the contents of a program register and a status register of the CPU 1 are cleared. In the CPU active state Ja2, the CPU is executing instructions stored in the ROM 2 or a sequencer installed in the CPU 1 is active in the exception processing, while the CoPro (i.e., the coprocessor 4) holds the contents of an internal register thereof without executing an instruction in a subsequent cycle (i.e., a CoPro inactive state). In the CoPro active state Ja3, the CoPro is executing a CoPro start instruction (i.e., an instruction to write data into the register unit 4-2-1) given by the CPU 1, while the CPU 1 holds the contents of the internal register thereof without executing an instruction in a subsequent cycle (i.e., a CPU inactive state).

The state transition of the conventional microcomputer will be discussed below.

Initially, the microcomputer is in the reset state Ja1. After a reset signal is released, the CPU active state Ja2 is entered without reservation.

In the CPU active state Ja2, the CPU 1 is not subjected to a state transition as long as it is executing an instruction or a sequence of instructions and, upon execution of the CoPro start instruction, goes to the CPU inactive state so that the CoPro active state Ja3 is entered.

In the CoPro active state Ja3, the CoPro is operating and, upon completion of the operation, goes to the CoPro inactive state (i.e., the CPU active state Ja2).

When the whole operation of the microcomputer is reset, the rest state Ja1 is entered.

Figure 9B:
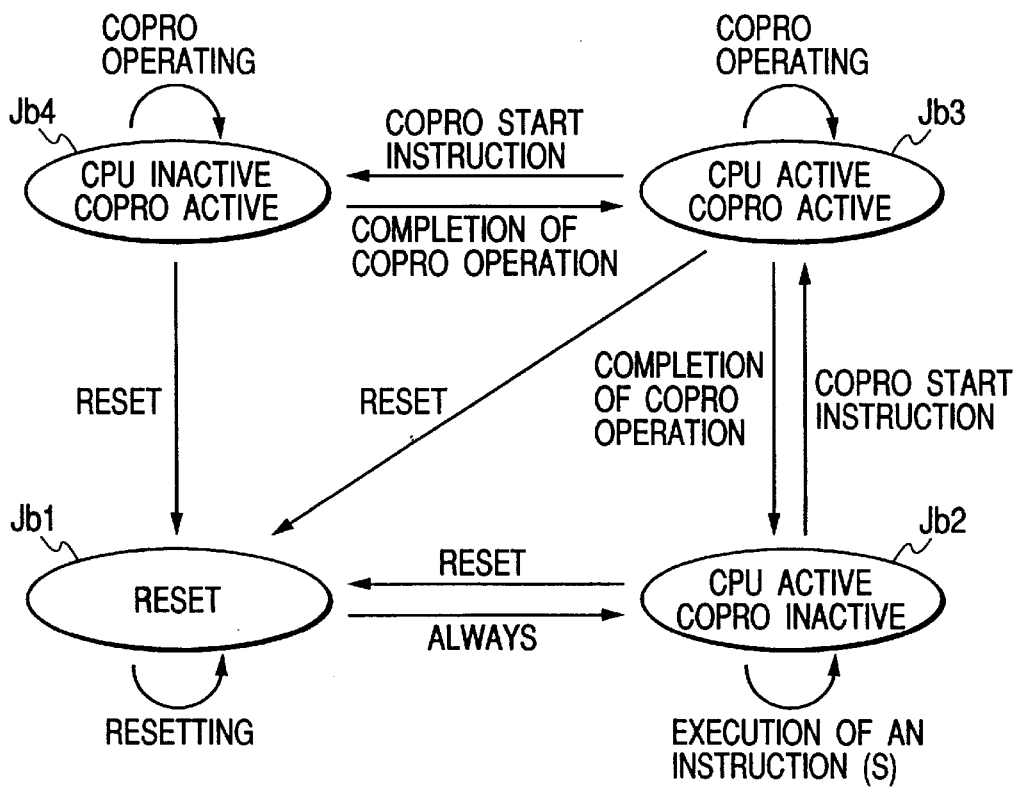
FIG. 9(b) is a state transition diagram of information processing apparatuses of the first and second embodiments.

The microcomputers 100 and 200 of the invention, as shown in FIG. 9(b), has four states: a reset state Jb1, a CPU active/CoPro inactive state Jb2, a CPU active/CoPro active state Jb3, and a CPU inactive/CoPro active state Jb4.

The reset state Jb1 is identical with the reset state Ja1. In the CPU active/CoPro inactive state Jb2, the CPU 1 is in the same state as the CPU active state Ja2, and the CoPro is at rest. In the CPU active/CoPro active state Jb3, the CPU 1 is in the same state as the CPU active state Ja2, and the CoPro is in the same state as the CoPro active state Ja3. In the CPU inactive/CoPro aactive state Jb4, the CPU 1 is at rest, and the CoPro is in the same state as the CoPro active state Ja3.

The state transition of the microcomputers 100 and 200 will be discussed below.

Initially, the microcomputers 100 and 200 are in the reset state Jb1. After a reset signal is released, the CPU active/CoPro inactive state Jb2 is entered without reservation.

In the CPU active/CoPro inactive state Jb2, the CPU 1 is not subjected to a state transition as long as it is executing an instruction or a sequence of instructions and, upon execution of the CoPro start instruction, goes to the CPU active/CoPro active state Jb3 so that the CPU 1 and the CoPro operate in parallel to each other.

Upon completion of an operation of the CoPro, the CPU active/CoPro active state Jb3 returns back to the CPU active/CoPro inactive state Jb2. If, however, a subsequent instruction read by the CPU 1 out of the ROM 2 is the CoPro start instruction, the CPU active/CoPro active state Jb3 goes to the CPU inactive/CoPro active state Jb4. This is because that during operation of the CoPro, a signal outputted from the CoPro to the CPU 1 through the control line 13 is, as described above, at the high level. In the CPU inactive/CoPro active state Jb4, the CoPro is performing an operation as specified by the CoPro start instruction given by the CPU 1 in the CPU active/CoPro inactive state Jb2, and the CPU 1 is at rest without executing a subsequent CoPro start instruction read out of the ROM 2.

In the CPU inactive/CoPro active state Jb4, the CoPro is operating and, upon completion of the operation, goes to the CPU active/CoPro active state Jb3. An instruction executed by the CoPro in the CPU active/CoPro active state Jb3 is not the CoPro start instruction provided in the first CPU active/CoPro inactive state Jb2, but a CoPro start instruction which is read by the CPU 1 out of the ROM 2 immediately before entering the CPU inactive/CoPro active state Jb4.

When the whole operation of the microcomputer is reset, the rest state Jb1 is entered.

The comparison between FIGS. 9(a) and 9(b) shows that the conventional microcomputer has no state in which the CPU 1 and the CoPro operate in parallel to each other, but the microcomputers 100 and 200 of this invention have the CPU active/CoPro active state Jb3 in which the CPU 1 and the CoPro operate simultaneously This is a significant feature of the invention which is achieved by the use of the separation switches 8 and 9 in the buses 6 and 7.

Figure 10:
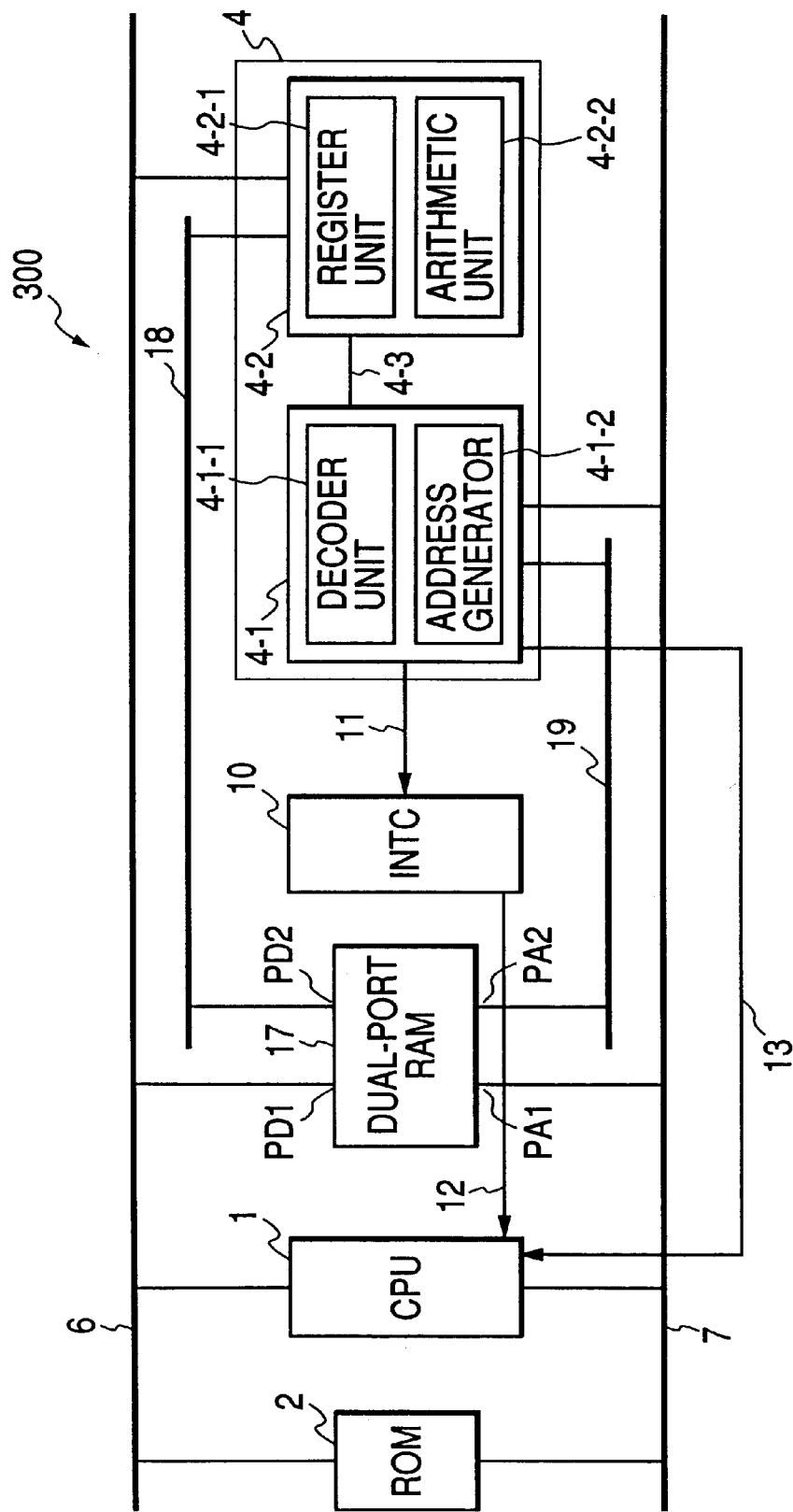
FIG. 10 is a block diagram which shows an information processing apparatus according to the third embodiment of the invention.

FIG. 10 shows a microcomputer 300 according to the third embodiment of the invention. The same reference numbers as employed in the first embodiment will refer to the same parts, and explanation thereof in detail will be omitted here.

The microcomputer 300 does not have the separation switches 8 and 9 used in the first and second embodiments and instead includes a dual port RAM 17 from and into which two data are read and written simultaneously through a pair of address port PA1 and PA2 and a pair of data ports PD1 and PD2.

The data port PD1 and the address port PA1 are connected to the data bus 6 and the address bus 7, respectively. The data port PD2 and the address port PA2 are connected to the coprocessor 4 through the second data bus 18 and the second address bus 19 which are separate from the data bus 6 and the address bus 7, respectively. Specifically, the data port PD2 communicates with the arithmetic section 4-2 of the coprocessor 4 through the second data bus 18. The address port PA2 communicates with the control section 4-1 of the coprocessor 4 through the second address bus 19.

The dual port RAM 17 is used instead of the RAMs 3 and 5 as employed in the first embodiment. Specifically, the CPU 1 writes the result of an operation executed therein and arithmetic data that is an operand entering the coprocessor 4 into the dual port RAM 17 through the data bus 6, the address bus 7, and the data port PD1 and reads required data out of the dual port RAM 17.

When the coprocessor 4 operates in the indirect addressing mode, it reads the arithmetic data written by the CPU 1 out of the dual port RAM 17 through the second data bus 18, the address bus 19, the data port PD2 and the address port PA2.

The circuit arrangement of this embodiment allows the CPU 1 and the coprocessor 4 to gain access to the dual port RAM 17 independently so that the CPU 11 and the coprocessor 4 can operate in parallel to each other. This results in a decrease in time required for the overall operation of the microcomputer 300.

Figure 11:
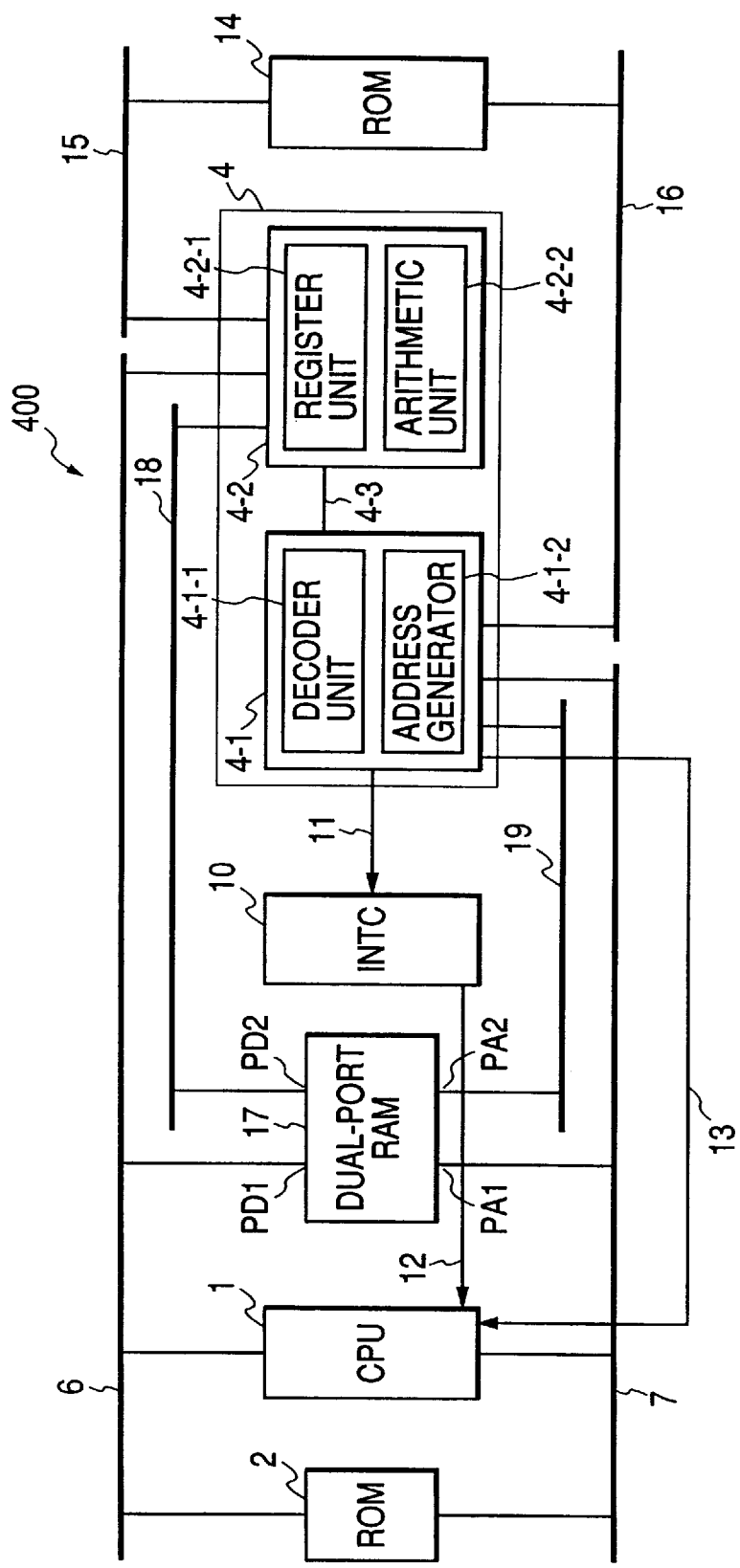
FIG. 11 is a block diagram which shows an information processing apparatus according to the fourth embodiment of the invention.

FIG. 11 shows a microcomputer 400 according to the fourth embodiment of the invention.

This embodiment is, as can be seen from the drawing, a combination of the second and third embodiments as shown in FIGS. 5 and 10. Specifically, the microcomputer 400 is different from the one shown in FIG. 10 only in that the ROM 14 storing therein constants used in executing the special arithmetic operations in the coprocessor 4 is disposed in connection with the arithmetic section 4-2 and the control section 4-1 through the second data bus 15 and the second address bus 16. Other arrangements are identical, and explanation thereof in detail will be omitted here.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

For example, the coprocessor 4 establishes input of the arithmetic data into the arithmetic section 4-2 both in the direct addressing mode and indirect addressing mode, but instead of the indirect addressing mode, an addressing mode with a displacement, a post increment, or a decrement may be used. The addressing mode is determined for each address or memory location of the register unit 4-2-1, but a preselected bit of data to be written by the CPU 1 into the register unit 4-2-1 may be used as an identifier for providing an indication of the type of addressing mode to the coprocessor 4. In this case, the number of addresses used in the register unit 4-2-1 may be decreased.

Further, a specified bit of data to be written into the register unit 4-2-1 may be used as an instruction identifier which indicates the type of instruction.

The ROM 14 of the microcomputers 200 and 400 in the second and fourth embodiments may be replaced with a RAM to which data on constants are transferred upon initiation of an operation of each of the microcomputers 200 and 400.

The coprocessor 4 of each of the third and fourth embodiments may write the result of an operation thereof into the dual port RAM 17. In this case, the CPU 1 reads the result of the operation of the coprocessor 4 out of the data port PD1 and the address port PA1 of the dual port RAM 17.

What is claimed is:

1. An information processing apparatus comprising:

a central processing unit;

a coprocessor connected to said central processing unit through a bus, said coprocessor including a control section and an arithmetic section, the control section being responsive to a start command issued by said central processing unit to have the arithmetic section execute a given operation and to output a switch control signal; and a switch disposed in the bus to selectively establish and block communication between said central processing unit and said coprocessor, said switch being responsive to the switch control signal outputted from said control section of said coprocessor to block the communication between said central processing unit and said coprocessor to allow said central processing unit and said auxiliary arithmetic unit to operate in parallel.

2. An information processing apparatus comprising:

a central processing unit;

an auxiliary arithmetic unit connected to said central processing unit through a bus, said auxiliary arithmetic unit including a control section and an arithmetic section, the control section being responsive to a start command issued by said central processing unit to have the arithmetic section execute a given operation and to output a switch control signal; and a switch disposed in the bus to selectively establish and block communication between said central processing unit and said auxiliary arithmetic unit, said switch being responsive to the switch control signal outputted from said control section of said auxiliary arithmetic unit to block the communication between said central processing unit and said auxiliary arithmetic unit to allow said central processing unit and said auxiliary arithmetic unit to operate in parallel, wherein said auxiliary arithmetic unit having memory locations corresponding to respective ones of the preselected operations, when data is written by said central processing unit into one of the memory locations, excutes a corresponding one of the preselected operations on the data written into the one of the memory locations and outputs a signal to said switch to block the communication between said central processing unit and said auxiliary arithmetic unit.

3. An information processing apparatus comprising:

a central processing unit;

an auxiliary arithmetic unit connected to said central processing unit through a bus, said auxiliary arithmetic unit including a control section and an arithmetic section, the control section being responsive to a start command issued by said central processing unit to have the arithmetic section execute a given operation and to output a switch control signal;

a switch disposed in the bus to selectively establish and block communication between said central processing unit and said auxiliary arithmetic unit, said switch being responsive to the switch control signal outputted from said control section of said arithmetic unit to block the communication between said central processing unit and said arithmetic unit to allow said central processing unit and said auxiliary arithmetic unit to operate in parallel; and a second bus which is isolated from said bus and which connects at least to said arithmetic unit.

4. An information processing unit as set forth in claim 3, further comprising a memory which connects with said second bus and which stores therein data on constants used in the operations executed by said auxiliary arithmetic unit.

5. An information processing apparatus comprising:

a central processing unit;

a coprocessor connected to said central processing unit through a bus, said coprocessor including a control section and an arithmetic section, the control section being responsive to a start command issued by said central processing unit to have the arithmetic section execute a given operation;

a register installed in said coprocessor having memory locations corresponding to each one of the given operations, when data is written by said central processing unit into one of the memory locations, the arithmetic section of said coprocessor executes a corresponding one of the preselected operations on the data written into the one of the memory locations; and a dual port memory having two pairs of ports one pair provided for each of said central processing unit and said coprocessor for allowing said central processing unit and said coprocessor to gain access to said dual port memory independently, one of each pair of ports being connected to said central processing unit through said bus and the other being connected to said coprocessor through a second bus for allowing said CPU and said coprocessor to operate in parallel.

6. An information processing unit as set forth in claim 5, wherein each of said central processing unit and said coprocessor stores and retrieves data into and from said dual port memory through one of the pairs of ports, and executes a given operation therein.

7. An information processing apparatus comprising:

a central processing unit;

an auxiliary arithmetic unit connected to said central processing unit through a bus, said arithmetic unit including a control section and an arithmetic section, the control section being responsive to a start command issued by said central processing unit to have the arithmetic section execute a given operation;

a register installed in said auxiliary arithmetic unit having memory locations corresponding to each one of the given operations, when data is written by said central processing unit into one of the memory locations, the arithmetic section of said auxiliary arithmetic unit executes a corresponding one of the preselected operations on the data written into the one of the memory locations;

a dual port memory having two pairs of ports, one pair provided for each of said central processing unit and said arithmetic unit for allowing said central processing unit and said arithmetic unit to gain access to said dual port memory independently, one of each pair of ports being connected to said central processing unit through said bus and the other being connected to said auxiliary arithmetic unit through a second bus for allowing said CPU and said auxiliary arithmetic unit to operate in parallel, and a third bus, isolated from said bus and said second bus, connecting at least said auxiliary arithmetic unit.

8. An information processing unit as set forth in claim 7, further comprising a memory which connects with said third bus and which stores therein data on constants used in the operations executed by said auxiliary arithmetic unit.

* * * * *